United States Patent
Gutmann et al.

[11] Patent Number: 6,095,303
[45] Date of Patent: Aug. 1, 2000

[54] COUPLING TOOTHING IN A GEARBOX

[75] Inventors: Peter Gutmann; Georg Tauschek, both of Munich, Germany

[73] Assignee: BLW Praezisionsschmiede GmbH, Munich, Germany

[21] Appl. No.: 09/217,003

[22] Filed: Dec. 21, 1998

Related U.S. Application Data

[63] Continuation of application No. PCT/EP97/03173, Jun. 18, 1997.

[30] Foreign Application Priority Data

Jun. 21, 1996 [DE] Germany .............. 196 24 774

[51] Int. Cl.$^7$ .............. F16D 11/14; F16D 21/00
[52] U.S. Cl. .................. 192/48.91; 192/69.91; 192/108; 192/114 T
[58] Field of Search .............. 192/48.91, 114 T, 192/108, 69.91, 69.83

[56] References Cited

U.S. PATENT DOCUMENTS

| | | | |
|---|---|---|---|
| 449,065 | 3/1891 | Bennett | 192/108 X |
| 2,019,549 | 11/1935 | Trout | 192/69.91 X |
| 2,220,463 | 11/1940 | Sinclair | 192/69.83 |
| 2,535,388 | 12/1950 | Burks et al. | 192/48.91 |
| 3,550,738 | 12/1970 | Halibrand . | |

FOREIGN PATENT DOCUMENTS

| | | |
|---|---|---|
| 52150 | 9/1936 | Denmark . |
| 19514349 | 12/1995 | Germany . |
| 4319135 | 9/1996 | Germany . |
| 59073627 | 4/1984 | Japan . |
| 2081822 | 2/1982 | United Kingdom . |
| WO 86/00838 | 2/1986 | WIPO . |

*Primary Examiner*—Rodney H. Bonck
*Attorney, Agent, or Firm*—Helfgott & Karas, PC.

[57] ABSTRACT

The invention relates to a coupling toothing in a gearbox between two rotationally symmetrical coupling structures (5,6) which can be coupled with each other. The toothing comprises the following features to increase the strength thereof: (a) both coupling structures (5,6) have claws on opposing sides which project axially from a base surface (10); (b) in a first of the two coupling structures (6), the claws (14,15,16) are arranged on the inner peripheral surface (17) of an outer collar (18) delimiting the base surface (10); (c) in the second of the two coupling structures (5), the claws (7,8) are arranged on the external periphery surface (9) of an inner collar (13) delimiting the base surface (10); and (d) the coupling surfaces of the two claws each have an undercut profile.

12 Claims, 5 Drawing Sheets

COUPLING TOOTHING IN A GEARBOX

This application is a continuation of PCT/EP97/03173 filed Jun. 18, 1997.

BACKGROUND OF THE INVENTION

The invention relates to a coupling toothing in a gearbox between two rotationally symmetrical coupling structures which can be coupled with each other or a gearbox with such coupling structures, respectively.

In a known coupling toothing (EP 0073985 B1) for the clutch of a motorcycle gearbox one of the two coupling structures is provided with claws projecting from a base surface and the other with recesses in which the claws engage when the driving connection is established. The coupling surfaces of the claws and recesses are undercut, which means that the flanks of the claws and recesses which actually effect the coupling connection are shaped in such a way that they incline inwards by several angular degrees from the tip towards the base. Corresponding inclinations of two interacting coupling surfaces ensure that the mesh thus effected will avoid coupling release under load.

Additionally, a coupling toothing or a gearbox with a coupling toothing according to document DK-52150 are known in which each of the two coupling structures is provided, on the side facing the respective other coupling structure, with claws axially projecting from the base surface, the claws of the gear wheel being additionally attached to the inner peripheral surface of an outer collar delimiting the base surface.

In contrast to these, the objective of the present invention consists in improving the known coupling toothing in such a way that it is also suited for the transmission of high torques while at the same time offering smooth shifting characteristics.

SUMMARY OF THE INVENTION

Accordingly, both coupling structures are provided with claws axially projecting from a base surface, each claw being attached on two sides, ensuring smooth and easy interlocking as the pitch or the claw distance, respectively, can be freely chosen and designed to offer optimal interlocking characteristics in practice.

A particularly high strength of the coupling structures is achieved by providing one with an outer collar and the other with an inner collar to which the respective claws are attached in addition to their connection with the base surface.

The total production cost of the coupling toothing proposed under the present invention is comparably small as neither of the coupling structures requires the fabrication of coupling surfaces in pocket-like recesses, the design instead comprising only coupling surfaces on claws which may be attached on two sides. In this connection, it is essential to note that the rational shaping method described in EP 0073985 B1 which consists only of a pre-forging and a cold calibrating process can be applied to produce the undercut claws.

As it is the claws of the two coupling structures which actually mesh, it is recommended, with a view to reducing the overall length of the gearbox, to design the outer collar in such a way that the height of the outer collar measured from the base surface is larger than the height of the claws measured from the base surface and to design the inner collar in such a way that the height of the inner collar measured from the base surface is smaller than the height of the clans measured from the base surface. To achieve an additional advantage, the claws attached to the inner collar can be stepped, the radially innermost step being approximately of the same height as the inner collar.

To additionally improve the shifting characteristics, a subset of the claws of one of the two coupling structures can, as an additional feature, slightly differ in height from the other claws of the same coupling structure. In the case of coupling structures with an even number of claws it is recommended to design one of the two coupling structures with alternating claws of two different heights. Thus the maximum contact surface on the roof side of the claws during the shifting process is reduced and a smooth interlocking of the claws is facilitated.

The interlocking process can, according to another proposal under the present invention, be further improved by designing the claws of at least one coupling structure with a laterally chamfered roof shape preferably curving in the direction of the circumference of the coupling structure, thus ensuring that contact between the axially meeting roof shapes during the interlocking process is limited to line contact.

The strength of the coupling structures can be further increased by providing the first coupling structure, in addition to an outer collar, with an inner collar positioned at a distance from the claws and by providing the second coupling structure, in addition to an inner collar, with an outer collar positioned at a distance from the claws.

To allow the transmission of particularly high torques while at the same time offering improved stability, the claws should be designed in such a way that the two coupling structures, when in mesh, are resting against each other with the full load-bearing lateral flanks of their claws.

Applying the teachings of the present invention to the design of a gearbox, it is possible, with a view to reducing the axial length of the gearbox, to provide the gearwheels with an external collar that delimits the base surface on which the claws are attached in such a way that they project radially inwards, while at the same time designing the sliding sleeve in such a way that the claws are attached to the outer peripheral surface of an inner collar delimiting the base surface. The sliding sleeve, which has a smaller diameter than the gear wheels, can cover a larger shifting distance as it partly slips, with its outer ring, into the correspondingly recessed front side of the neighbouring gear wheel.

BRIEF DESCRIPTION OF THE DRAWINGS

In the following the different designs proposed under the present invention are described on the basis of the respective drawings.

DETAILED DESCRIPTION OF THE INVENTION

Figure 1:
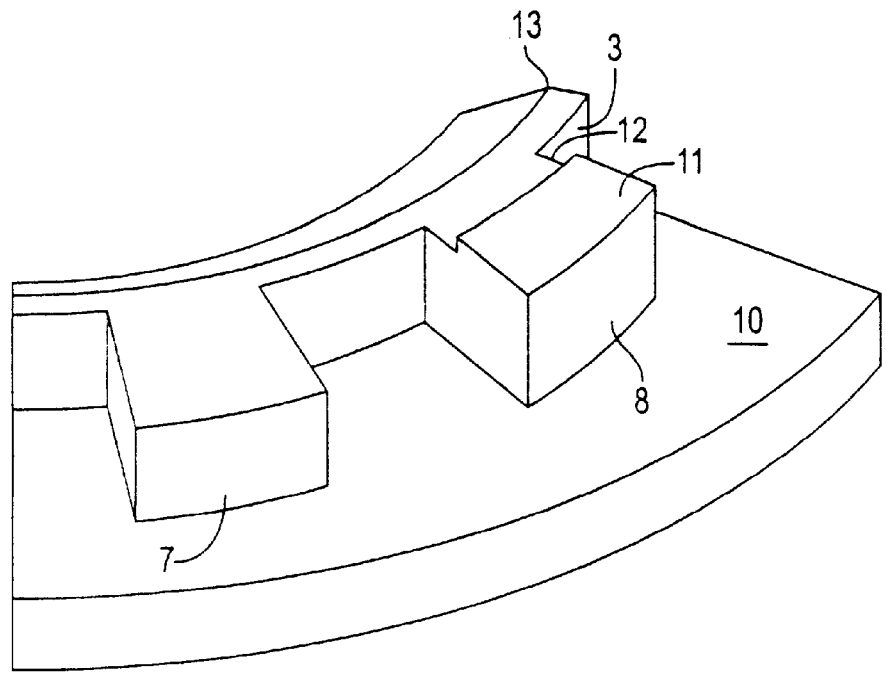
FIG. 1 shows the perspective view of a sector-like portion of a sliding sleeve.
Figure 4:
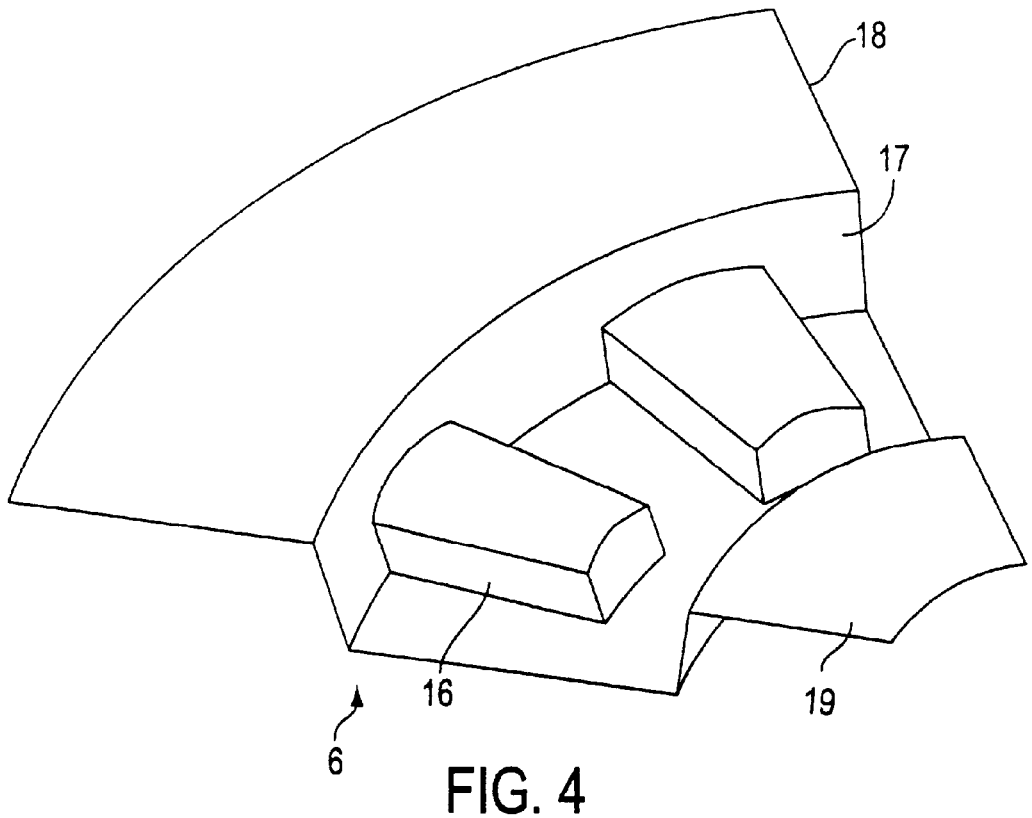
FIG. 4 shows a variant of FIG. 2 with a curved roof shape.
Figure 5:
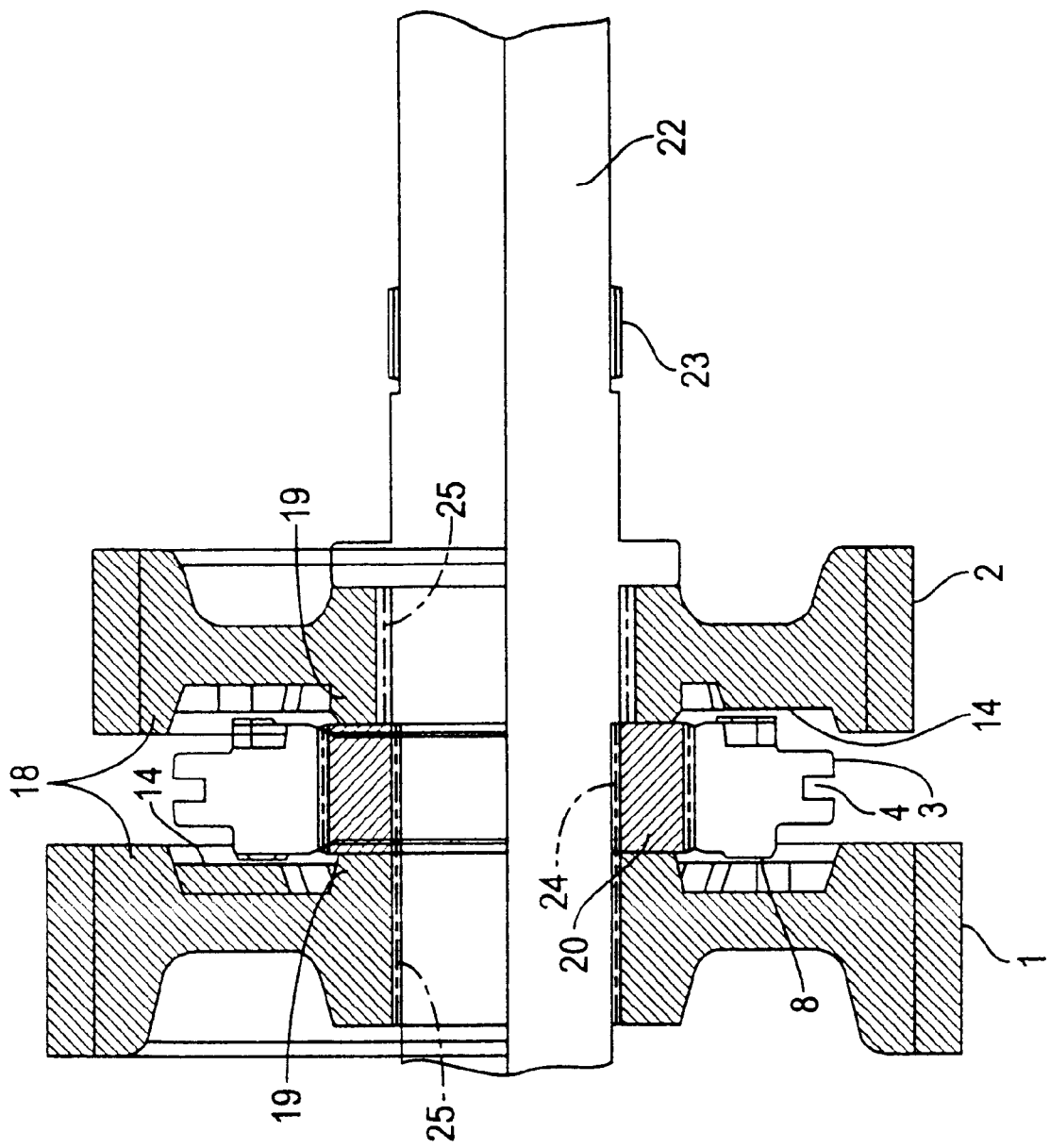
FIG. 5 shows an axial section through a portion of the drive shaft of a gearbox with two gear wheels and an interposed sliding sleeve.
Figure 6:
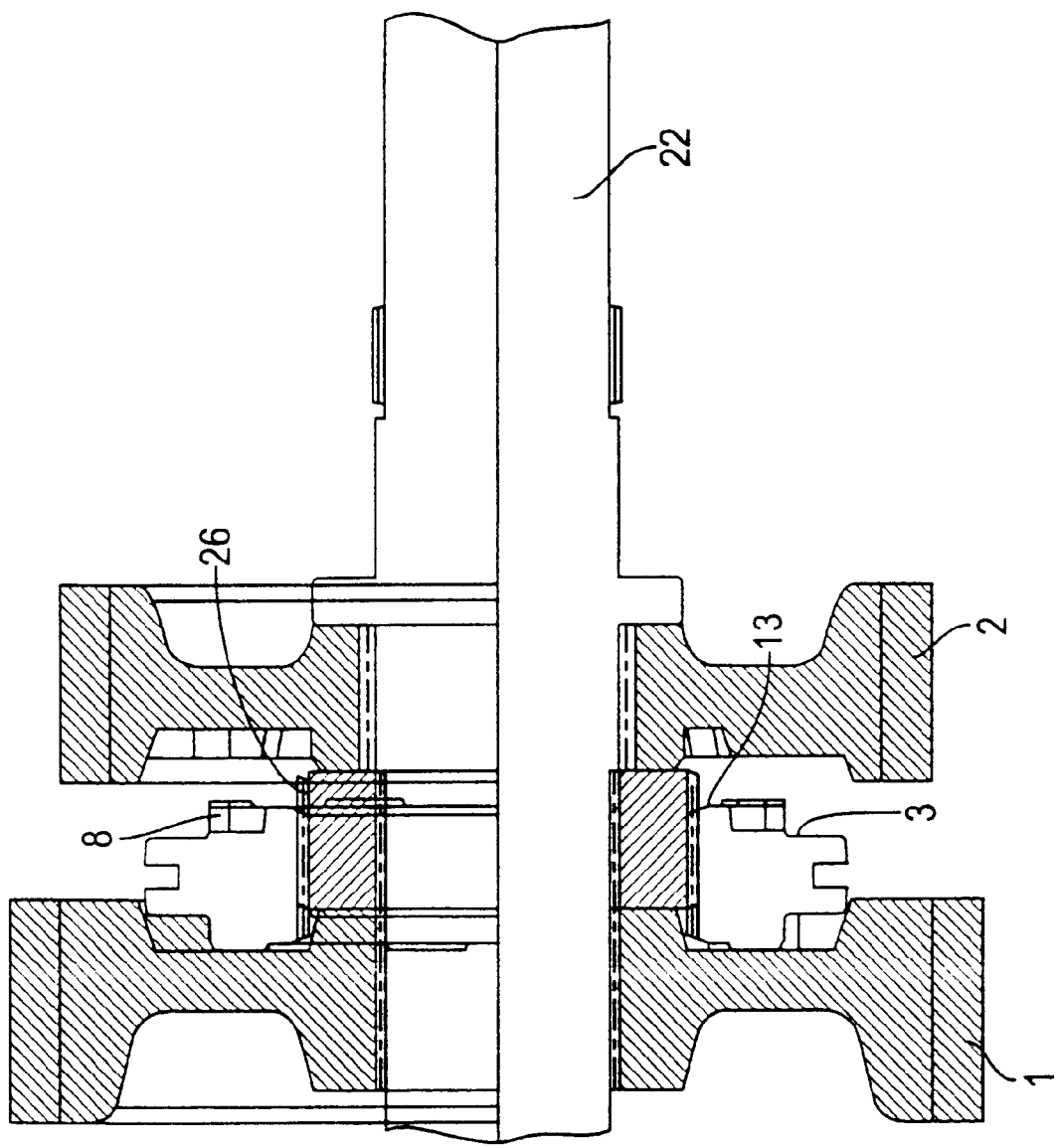
FIG. 6 shows a view as described in FIG. 5 with the first gear engaged.
Figure 7:
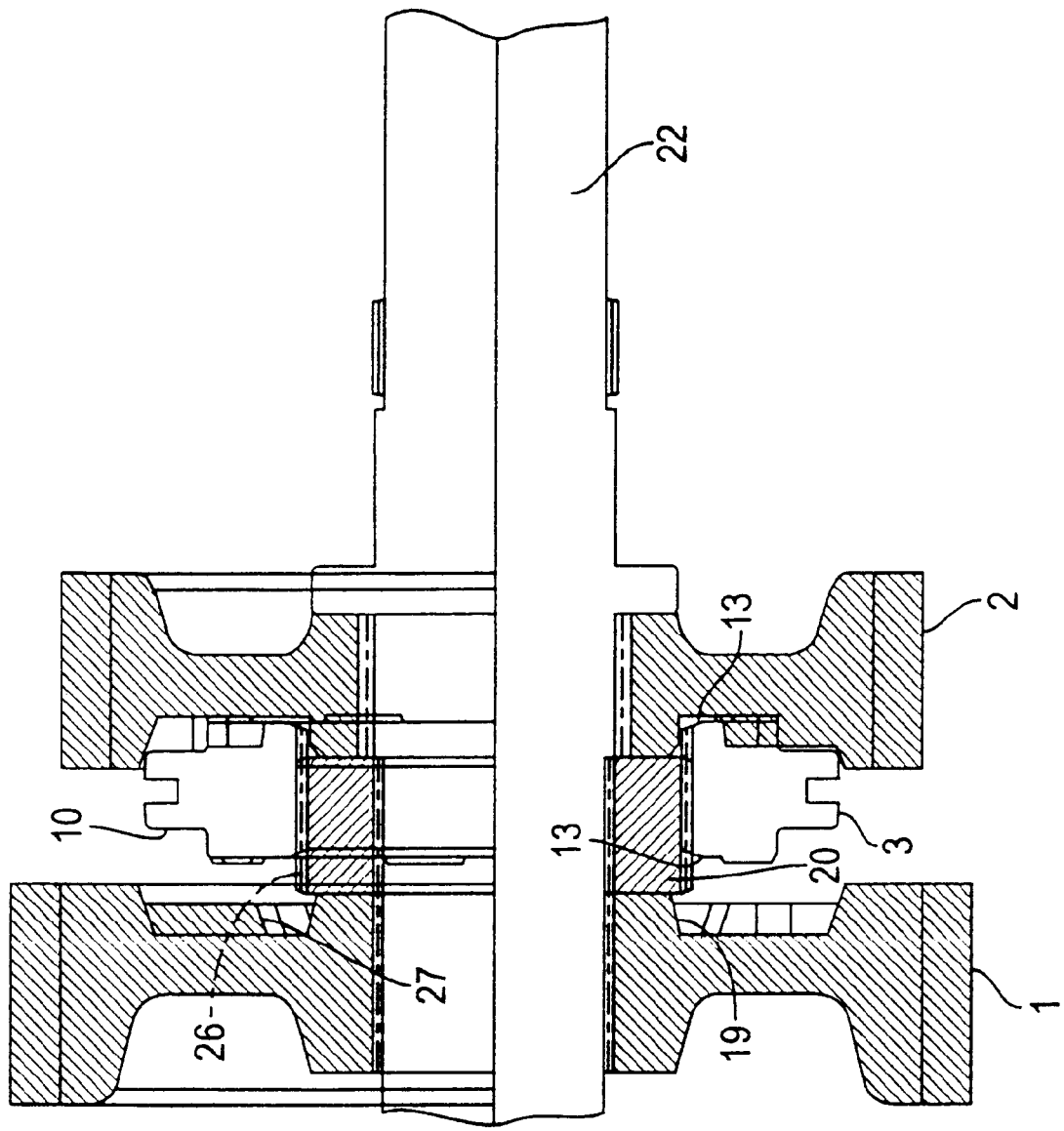
FIG. 7 shows a view as described in FIG. 5 with the second gear engaged.

An example for a gearbox is illustrated in FIGS. 5–7, the illustration being limited to gearwheel 1 for the first gear, gear wheel 2 for the second gear and an interposed sliding sleeve 3. Sliding sleeve 3 either meshes with gear wheel/$1^{st}$ gear 1 or gear wheel/$2^{nd}$ gear 2, depending on whether sliding sleeve 3 is, by means of a shift lever not shown in the drawing that engages in groove 4 of sliding sleeve 3, pushed leftwards or rightwards into the respective interlocking position. The left interlocking position, i.e. the position for meshing with gear wheel/$1^{st}$ gear 1 is illustrated in FIG. 6, the right interlocking position, i.e. the position for meshing with gear wheel/$2^{nd}$ gear 2 is illustrated in FIG. 7. In both cases the sliding sleeve constitutes, within the respective coupling connection established, one coupling structure 5 as illustrated in FIG. 1 while the respective gear wheel represents an additional coupling structure 6 as illustrated in the three variants in FIGS. 2 to 4. Both coupling structures have an inner region, a center region and an outer region.

Coupling structure 5 according to FIG. 1 is provided with claws 7, 8, which are attached to an inner peripheral surface 9 and, apart from that, to a base surface 10. The sector of coupling structure 5 illustrated in a perspective view in FIG. 1 represents one of the claw toothings on sliding sleeve 3. Located next to each other, claws 7 and 8 are of different height, the height of claw 7 matching the height of peripheral surface 9 or an inner collar 13 constituting such peripheral surface, respectively, while claw 8 is stepped, the radially outermost step 11 being higher than the radially innermost step 12, the latter being flush with the front side of inner collar 13.

The "second" coupling structure illustrated in FIG. 1 can be provided with claws of equal height or, provided that an even number of claws exists, with alternating claws of two different heights. Claws with different heights reduce the supporting surface during the initial contact between the claws of the two coupling structures during the interlocking process, thus facilitating a smooth interlocking process.

Figure 2:
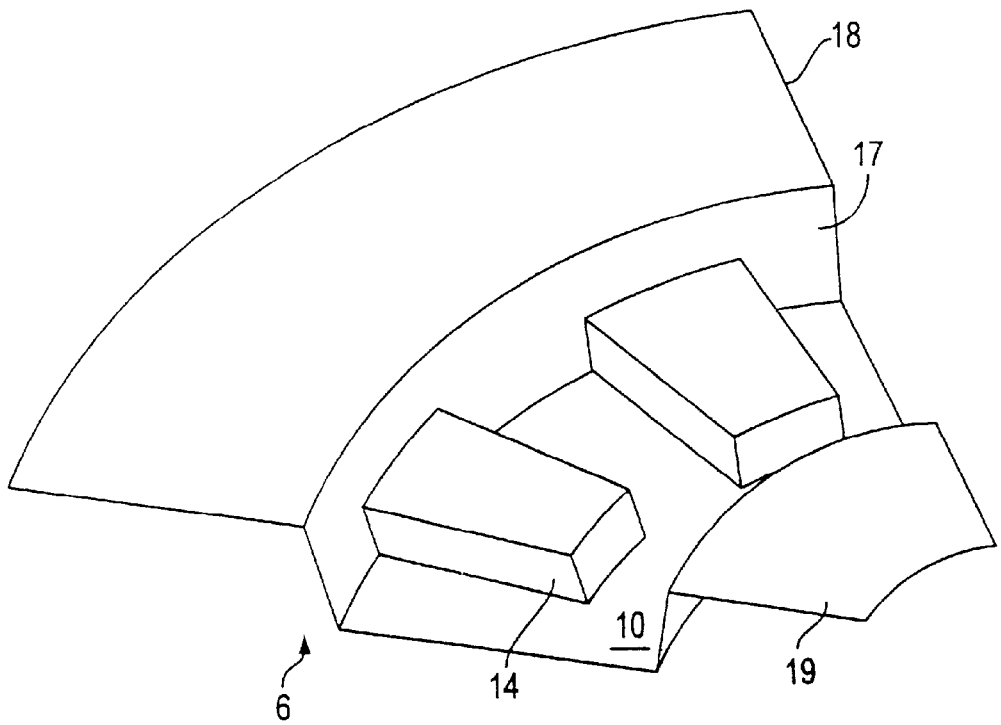
FIG. 2 shows the perspective view of a sector-like portion of a gear wheel.
Figure 3:
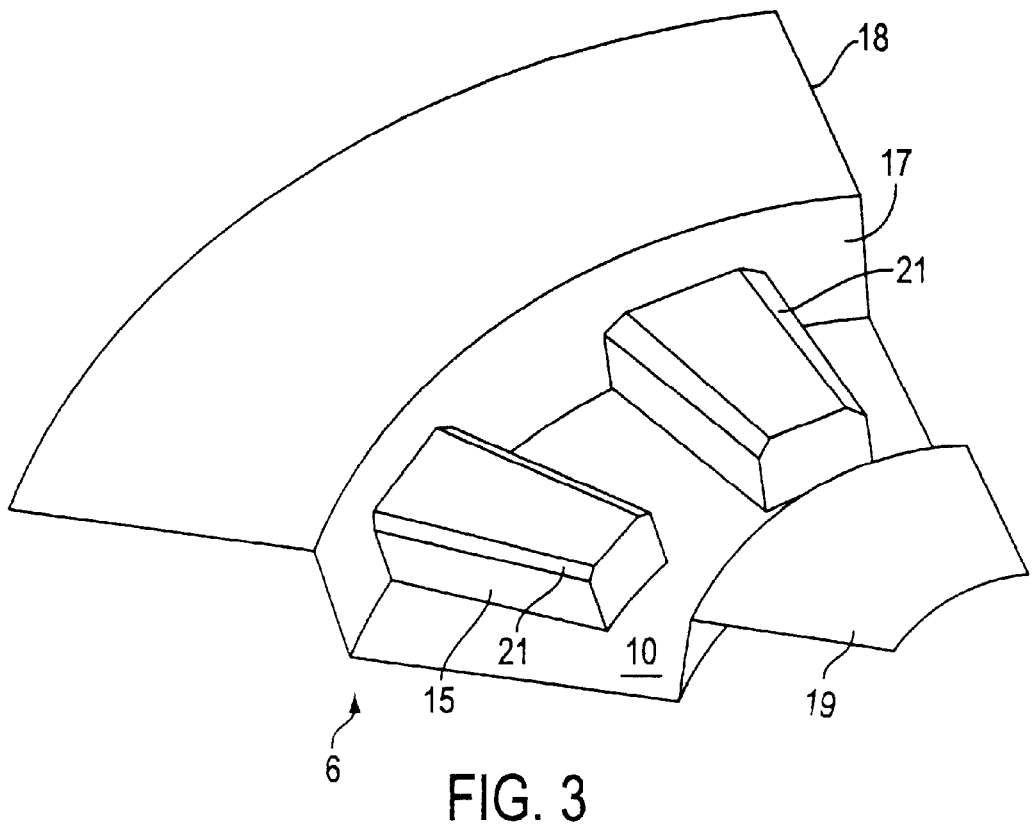
FIG. 3 shows a variant of FIG. 2 with a laterally chamfered roof shape.

FIGS. 2–4 each illustrate a version of the "first" coupling structure 6 which thus represents the counter-toothing that meshes with the "second" coupling structure 5 according to FIG. 1. The first coupling structure 6 has claws 14, 15, 16 attached to the inner peripheral surface 17 of an outer collar 18 delimiting base surface 10. The height of outer collar 18 measured from base surface 10 is larger than the height of claws 14, 15, 16 measured from the base surface. In addition to outer collar 18, the first coupling structure also comprises an inner collar 19 positioned at a distance from claws 14, 15, 16. The illustration only shows the exterior shape, i.e. the surface of the depicted sector of claw toothing as part of a coupling toothing. Such a claw toothing is provided, with reference to the gearbox according to FIGS. 5–7, on the side facing the sliding sleeve of gear wheels 1 and 2. If sliding sleeve 3, on the intermediate structure 20 which supports it, is axially shifted in the direction of either of the two neighbouring gear wheels 1 and 2, claws 7 and 8 of sliding sleeve 3 on the side facing the chosen counterpart will slip between claws 14, 15 and 16 of the claw toothing of the respective gearwheel which, after meshing of the claw toothings, constitutes a coupling connection with the allocated claw toothing of sliding sleeve 3.

The designs shown in FIGS. 2–4 are characterised by different claw shapes.

The coupling structure illustrated in FIG. 2 is provided with 6 claws 14 with a plane roof shape.

The coupling structure illustrated in FIG. 3 has 6 claws 15 with a laterally chamfered (21) roof shape.

The coupling structure illustrated in FIG. 4 has 6 claws 16 with a curved roof shape, the curve following the shape of the circumference of the coupling structure. In contrast to the plane roof shape (FIG. 2), claws with laterally chamfered roof shapes 21 (FIG. 3) and claws with curved roof shapes (FIG. 4) facilitate the interlocking of the claw toothings meeting in axial direction.

In FIGS. 1–4 the undercutting normally found in such coupling toothings is, in order to simplify the drawing, not shown for the lateral flanks of claws 7, 8, 14, 15 and 16. Undercutting in this connection means that the roof surface of the claws, measured in the direction of the circumference of the coupling structure, is wider than the base surface, which means that the lateral flanks slightly—i.e. by up to 5 angular degrees—incline inwards from the roof surface to the base surface, thus ensuring that interlocking claws wedge properly, thus preventing the toothing connection from disengaging under load. Considering that the corresponding lateral flanks of the claws rest against each other when load is applied, it is recommended, in order A) reduce wear, to shape the lateral flanks in such a way that contact between meshed teeth tales place over a whole contact surface. This criterion of course does not apply during the first phase of the interlocking process where the axial outer surfaces of the coupling structures meet for just a short time. In this case the roof shape of the claws must be designed in such a way that contact between the claws moving axially towards each other is limited to line contact, thus reducing friction. This is achieved by laterally chamfered 21 claws 15 according FIG. 3 and, even better, by the curved roof shape of claws 16 according to FIG. 4.

Of the gearbox of which sections are illustrated in FIGS. 5–7 only the gear wheels for the first gear 1 and for the second gear 2 are shown. The driven shaft 22 on which these gear wheels are mounted is cut on both sides. On the right part of the driven shaft splines (23) for an additional sliding sleeve between the gear wheels for the third and fourth gear are shown, the sliding sleeve and the two additional gear wheels, however, not being included in the drawing.

The two gear wheels for the first and second gear 1 and 2 shown in the drawing are provided with an outer collar 18 at their outer circumference and an inner collar 19 positioned at a distance from the claws, as schematically illustrated in FIGS. 2–4. The section through the two gear wheels shows in both cases one claw 14 with a plane roof shape, the claw also shown in section. Stepped claws 8 according to the right portion of FIG. 1 were chosen for the claw toothing on sliding sleeve 3. Sliding sleeve 3 is positioned on an intermediate structure 20 which is, via wedge toothing 24, connected with driven shaft 22. The permanently rotating gear wheels 1 and 2 are for practical reasons provided with needle bearings 25. A gear wheel is engaged by axially shifting the sliding sleeve 3 on its seat 26 with the intermediate structure 20 from its neutral centre position according to FIG. 5 either to the left to effect coupling with gear wheel/$1^{st}$ gear 1 (FIG. 6) or to the right to effect coupling with gear wheel/$2^{nd}$ gear 2 (FIG. 7).

FIGS. 6 and 7, where the coupling structures are shown in mesh, show that the sliding sleeve (3) its base surface 10 facing the respective gear wheel slips into a corresponding recess of the gear wheel, the claws thus interlocking, and that the inner collar 13 of the sliding sleeve slips into the space between the front sides 27 of the claws 14 and the inner collar 19 of the respective gear wheel. Thus a coupling toothing with reduced axial length is effected.

What is claimed is:

1. Coupling toothing in a gearbox between two rotationally symmetrical coupling structures (5, 6) which can be coupled with each other, wherein:
   a) both coupling structures (5, 6) have an inner region, a center region and an outer region, face each other and are provided with claws, which axially project from a base surface (10),
   b) the first of the two coupling structures (6) having a first group of claws (14, 15, 16) located in the center region and are attached to the inner peripheral surface (17) of an outer collar (18) delimiting the base surface (10),
   c) the second of the two coupling structures (5) having a second group of claws (7, 8) located in the center region and attached to the outer peripheral surface (9) of an inner collar (13) delimiting the base surface (10), and
   d) the coupling surfaces of the first group and the second group of claws are undercut.

2. Coupling toothing according to claim 1, wherein at least one claw of the first group of claws is a slightly different height than the remaining claws of the first group of claws.

3. Coupling toothing according to claim 1, wherein at least one claw of the second group of claws is a slightly different height than the remaining claws of the second group of claws.

4. Coupling toothing according to claim 3, wherein the second group of claws (7, 8) are arranged in an alternating pattern.

5. Coupling toothing according to claim 1, wherein at least one claw of at least one coupling structure is curved in the same direction as the circumference of the coupling structure, ensuring that the contact of the axially meeting roof shapes during the interlocking process is limited to line contact only.

6. Coupling toothing according to claim 1, wherein at least one claw of at least one coupling structure is provided with a laterally chamfered roof shape, ensuring that the contact of the axially meeting roof shapes during the interlocking process is limited to line contact only.

7. Coupling toothing according to claim 1, wherein a first and second lateral supporting flank of said first and second coupling structures (5, 6), respectively fully rest against each other while the first and second coupling structures are in mesh.

8. Coupling toothing according to claim 1, wherein the first coupling structure (6) is, in addition to the outer collar (18), provided with an inner collar (19) positioned at a distance from the claws.

9. Gearbox with a coupling toothing according to claim 1, the first coupling structure (6) consisting of a gear wheel (1, 2), the second structure (5) consisting of a sliding sleeve (3).

10. Coupling toothing in a gearbox between two rotationally symmetrical coupling structures which can be coupled with each other,
    a) both coupling structures have an inner region, a center region and an outer region, face each other and are provided with claws, which axially project from a base surface,
    b) the first of the two coupling structures having a first group of claws located in the center region and are attached to the inner peripheral surface of an outer collar delimiting the base surface,
    c) the second of the two coupling structures having a second group of claws located in the center region and attached to the outer peripheral surface of an inner collar delimiting the base surface, and
    d) the coupling surfaces of the first group and the second group of claws are undercut wherein the height of the inner collar measured from the base surface is larger than the height of the first group of claws.

11. Coupling toothing in a gearbox between two rotationally symmetrical coupling structures which can be coupled with each other,
    a) both coupling structures have an inner region, a center region and an outer region, face each other and are provided with claws, which axially project from a base surface,
    b) in the first of the two coupling structures having a first group of claws located in the center region and are attached to the inner peripheral surface of an outer collar delimiting the base surface,
    c) the second of the two coupling structures having a second group of claws located in the center region and attached to the outer peripheral surface of an inner collar delimiting the base surface, and
    d) the coupling surfaces of the first group and the second group of claws are undercut wherein the height of the inner collar measured from the base surface is smaller than the height of the second group of claws.

12. Coupling toothing according to claim 11, wherein the second group of claws (7, 8) are stepped with a radially innermost step (12) corresponding approximately with the height of the inner collar (13).

* * * * *